(12) United States Patent
Andrews et al.

(10) Patent No.: US 11,708,915 B2
(45) Date of Patent: Jul. 25, 2023

(54) BALL VALVE WITH INTEGRAL GEAR

(71) Applicant: Eaton Intelligent Power Limited, Dublin (IE)

(72) Inventors: Ian Paul Andrews, Portsmouth (GB); Daniel Bray, Winchester (GB)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/129,968

(22) Filed: Dec. 22, 2020

(65) Prior Publication Data

US 2021/0190232 A1 Jun. 24, 2021

(30) Foreign Application Priority Data

Dec. 23, 2019 (GB) ..................................... 1919194

(51) Int. Cl.
*F16K 31/53* (2006.01)
*F16K 5/06* (2006.01)

(52) U.S. Cl.
CPC .......... *F16K 31/535* (2013.01); *F16K 5/0647* (2013.01)

(58) Field of Classification Search
CPC .... F16K 31/535; F16K 5/0647; F16K 5/0442; Y10T 137/6099
USPC ....................................................... 251/248
See application file for complete search history.

(56) References Cited

U.S. PATENT DOCUMENTS

| 5,535,715 A | * | 7/1996 | Mouton | F01B 9/047 |
| | | | | 123/197.1 |
| 6,378,841 B1 | * | 4/2002 | Russell | F16K 5/201 |
| | | | | 251/158 |
| 9,903,483 B2 | * | 2/2018 | Liu | F16K 5/204 |
| 2013/0026397 A1 | | 1/2013 | Burgess | |
| 2015/0027575 A1 | * | 1/2015 | Morein | F01P 7/14 |
| | | | | 137/865 |
| 2020/0248836 A1 | * | 8/2020 | Bugeja | F16K 11/0873 |

FOREIGN PATENT DOCUMENTS

| CN | 106996465 A | | 8/2017 | |
| DE | 102004060517 B3 | * | 8/2006 | .......... F16K 31/535 |
| GB | 1211035 A | * | 11/1970 | .......... F16K 31/535 |
| JP | 6065979 A | | 4/1985 | |
| WO | 2018141468 A1 | | 8/2018 | |
| WO | WO-2020207574 A1 | * | 10/2020 | .............. F01P 7/165 |

OTHER PUBLICATIONS

European Search Report and Written Opinion, Issued in Application No. EP 20213758.4; dated Oct. 5, 2021; 7 pages.

* cited by examiner

*Primary Examiner* — Kenneth Rinehart
*Assistant Examiner* — Nicole Gardner
(74) *Attorney, Agent, or Firm* — Merchant & Gould P.C.

(57) ABSTRACT

A ball valve includes a valve body. The valve body is driven to rotate through a drive train that includes a planetary gear set. A gear of the planetary gear set is integrally formed with the valve body. In an embodiment, a ring gear of the planetary gear set is integrally formed with the valve body.

20 Claims, 7 Drawing Sheets

BALL VALVE WITH INTEGRAL GEAR

CROSS-REFERENCE TO PRIOR APPLICATION

Priority is claimed to British Patent Application No. GB 1919194.9, filed on Dec. 23, 2019, the entire disclosure of which is hereby incorporated by reference herein.

FIELD

The invention relates to a ball valve, and more particularly to a ball valve where a gear member is integrally formed on the valve member.

BACKGROUND

Ball valves are well known as a means of controlling flow in a pipeline, and as the skilled person will be aware of how they operate, this will not be described in detail. Ball valves can be driven to rotate in a number of ways; for example, a shaft connected to the valve body can be directly rotated (by means such as a handwheel or a motor).

However, rather than direct drive, it is common for some form of epicyclic gear train or planetary gear to be used in the drive train. This can increase the torque applied to the valve body, which can make it easier to move the valve body and/or reduce the amount of torque which must be applied to a handwheel to operate the valve (see, for example, US 2013/0026397, where a series of planetary gear phases are used to increase the torque applied to a valve body). Further, the ball valve will rotate more slowly than the input drive shaft, and this can reduce the risk of water hammer and other unwanted effects of closing the valve too quickly (as explained in JPS 6065979).

In US 2013/0026397, the last planetary gear phase is attached to a gear which drives a pinion connected to the valve body. In JPS 6065979, the planetary gear has an input shaft coupled to a handwheel and an output shaft connected to the valve body.

SUMMARY

In an embodiment, the present invention provides a ball valve, comprising: a valve body, wherein the valve body is configured to be driven to rotate through a drive train that includes a planetary gear set, and wherein a gear of the planetary gear set is integrally formed with the valve body.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a ball valve with a valve body, wherein the valve body is driven to rotate through a drive train which includes a planetary gear set, and wherein a gear of the planetary gear set is integrally formed with the valve body.

Integrally forming a gear of the planetary gear set with the valve body reduces the number of parts in the valve system, and also reduces backlash in the drive system.

Either the ring gear or the sun gear of the planetary gear set may be integrally formed with the valve body. Preferably, it is the ring gear of the planetary gear set which is integrally formed with the valve body.

In a preferred embodiment, the gear of the planetary gear set is formed is a recess on an outer surface of the valve body.

Providing the gear in a recess means that the gear does not project beyond the outer surface of the valve body. As a result, conventional polishing procedures can be applied to the valve body.

The invention also extends to a refuel manifold for a gas turbine engine, including a plurality of ball valves as described above.

Figure 1:
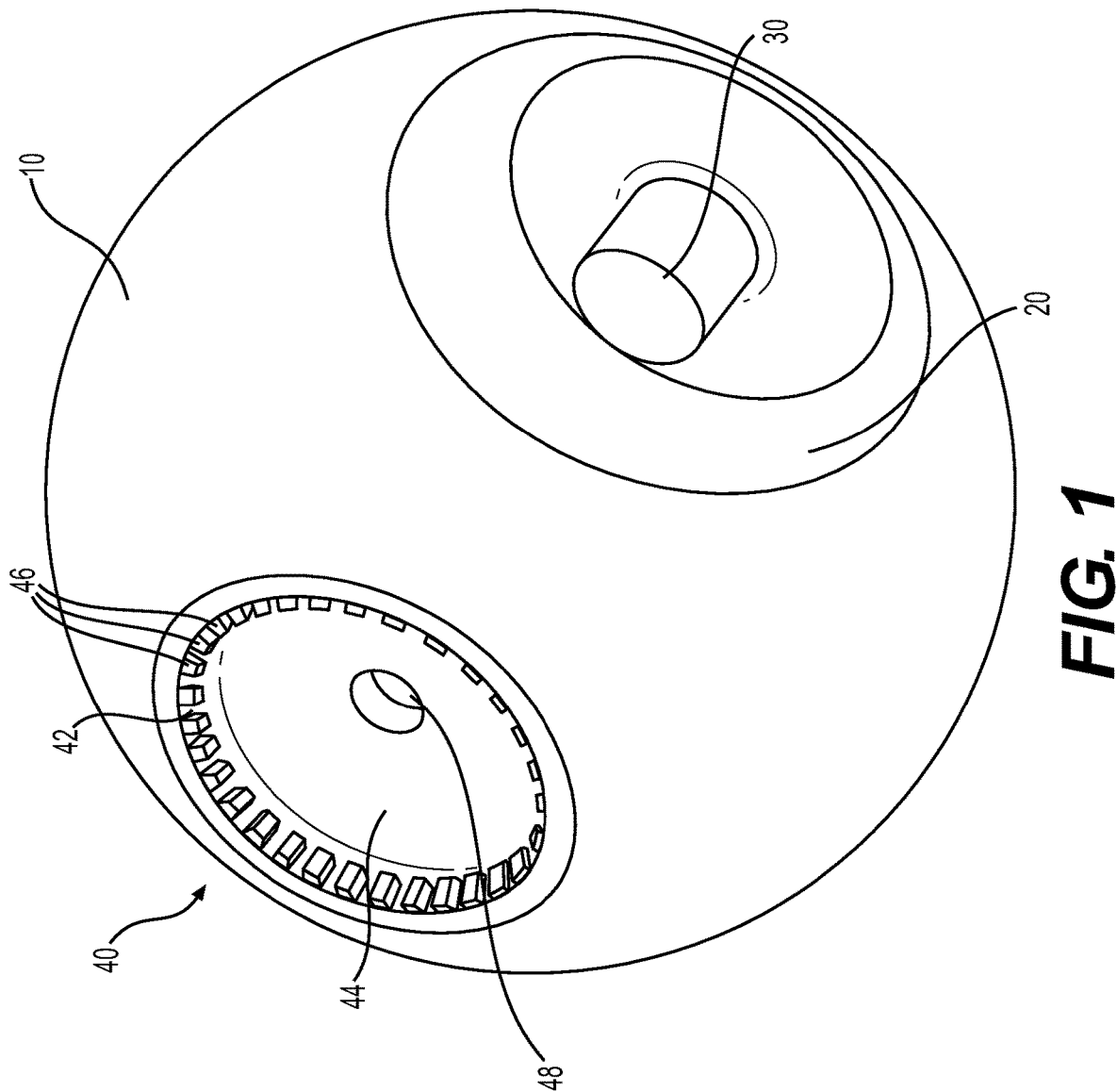
FIG. 1 is a perspective view of a valve body for a ball valve in accordance with a currently preferred aspect of the invention.
Figure 6:
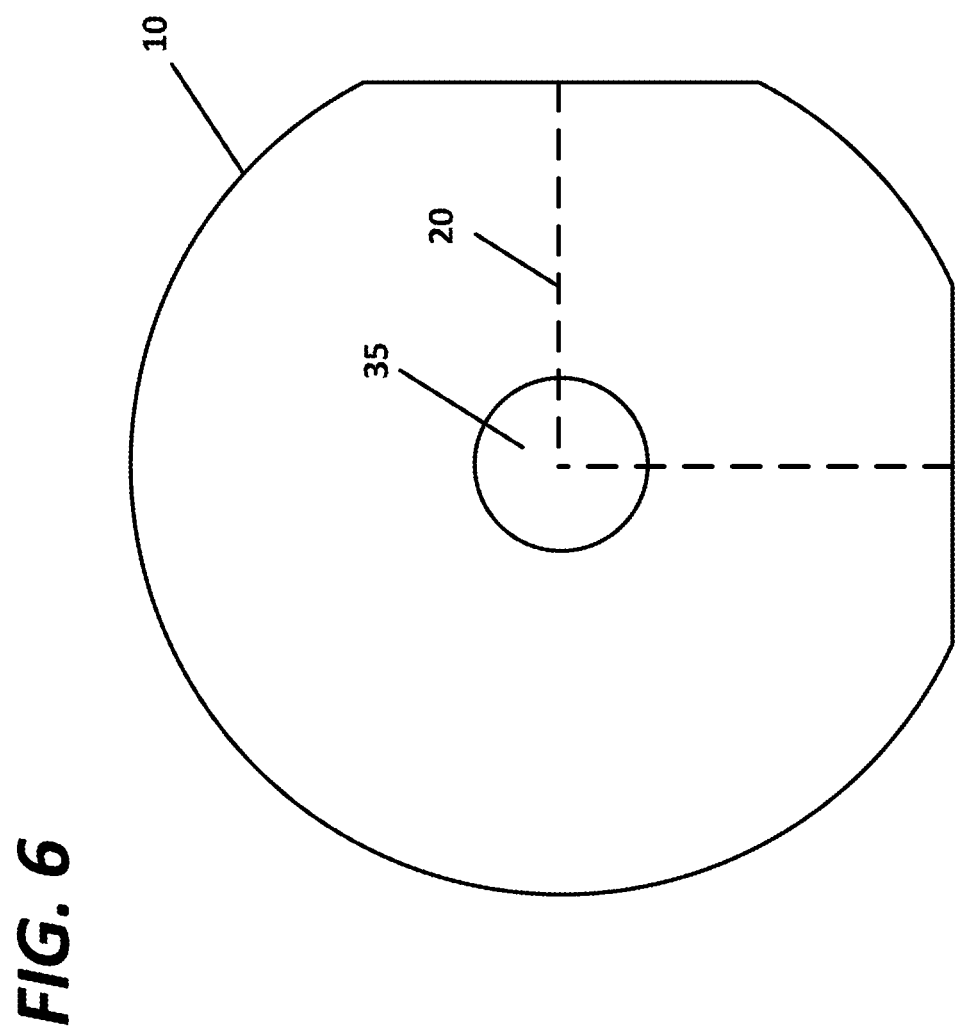
FIG. 6 shows the valve body of FIG. 5 when the flow passage is L-shaped.
Figure 7:
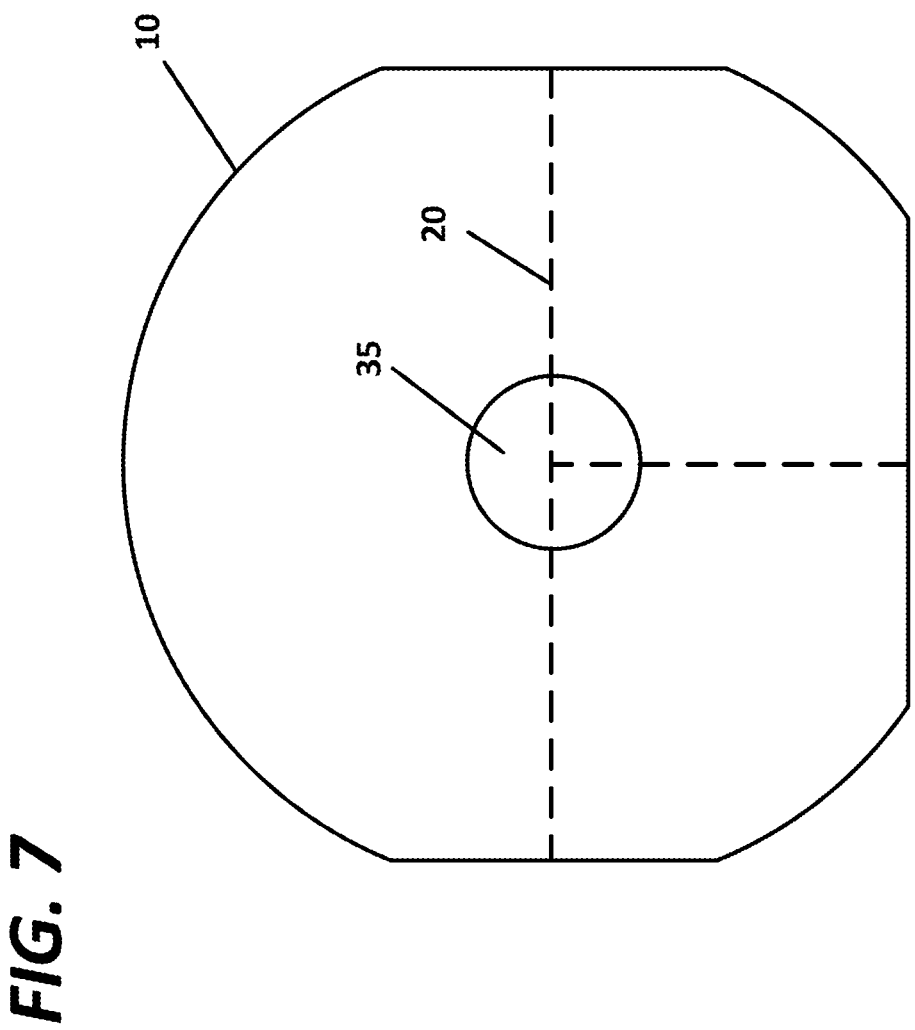
FIG. 7 shows the valve body of FIG. 5 when the flow passage is T-shaped.

As shown in FIG. 1, the valve body 10 is generally spherical, with a flow passage 20 formed therethrough and passing through the centre of the sphere. The valve body 10 is arranged to rotate about an axis which is perpendicular to the axis of the flow passage 20. When the flow passage 20 is aligned with a passage in the valve housing, fluid can flow through the valve and the valve is open. When the valve body is rotated around its axis of rotation through 90 degrees, the flow passage 20 is perpendicular to the passage in the valve housing, fluid cannot flow through the valve and the valve is closed. This arrangement is routine for a ball valve. Other arrangements (such as where the flow passage 20 is L-shaped (see FIG. 6) or T-shaped (see FIG. 7) when seen along the axis of rotation) are well known.

Figure 5:
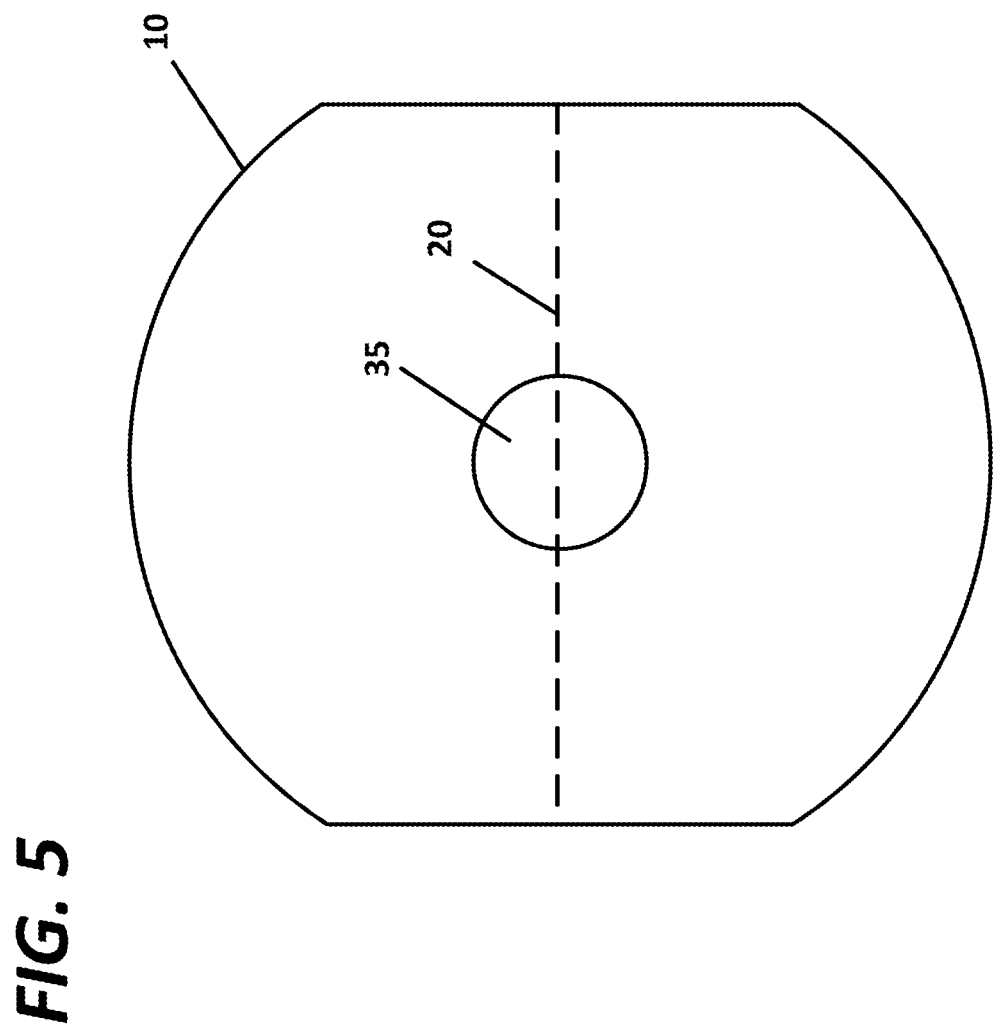
FIG. 5 is an end view of the valve body of FIG. 1 showing a first recess formed by a hollow projection.

Means for supporting the valve body 10 during rotation are provided at either end of the axis of rotation. In particular, at one end of the axis, there is provided a small projection 30 which projects into the flow passage 20, as can be seen in FIG. 1. This projection is hollow, and thus forms a first recess 35 (see FIG. 5) which can accommodate a trunnion on the valve housing.

At the other end of the axis, a second recess 40 is formed on the outer surface of the valve body 10. This second recess 40 is wider than the projection, and has an inner wall 42 surrounding and facing the axis of rotation, and a base wall 44 which is generally perpendicular to the axis of rotation. Teeth 46 are integrally formed on the inner wall 42, and project radially inwards, towards the axis of rotation. Thus, the inner wall 42 of the second recess 40 can function as a ring gear.

As the ring gear is formed in a recess 40, it does not project beyond the spherical surface of the valve body 10. Accordingly, it is possible to use conventional polishing techniques on the spherical surface of the valve body 10.

An additional recess 48 is formed in the base wall 44, concentric with the axis of rotation. This additional recess 48 can accommodate the end of a shaft.

The skilled person will appreciate that the valve can function in any orientation. The valve body 10 is constrained to rotate about the axis of rotation by the engagement of the trunnion in the first recess, and the engagement of the shaft in the additional recess 48.

Figure 2:
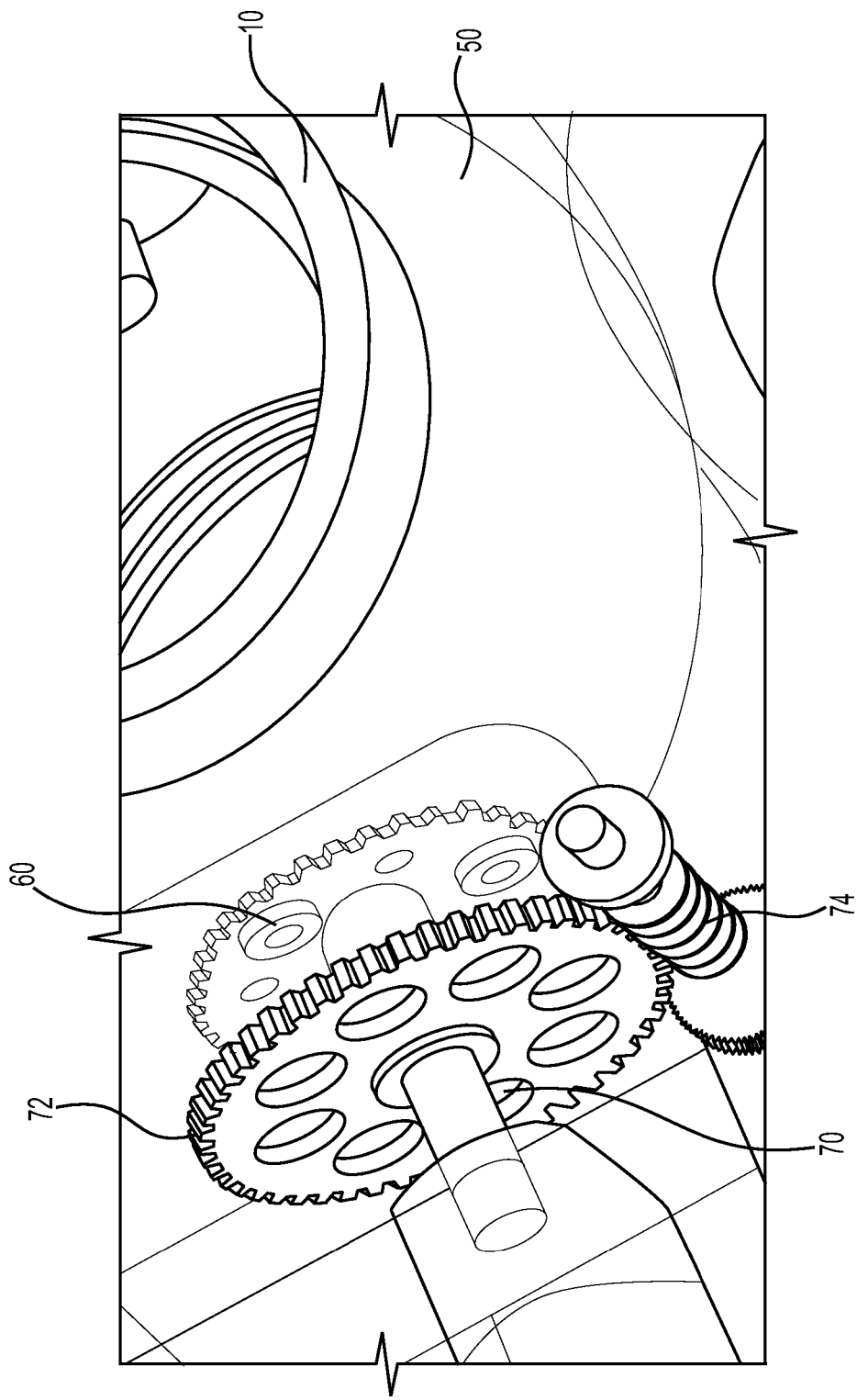
FIG. 2 is a perspective view showing the valve body of FIG. 1 as installed and connected to a drive mechanism.
Figure 3:
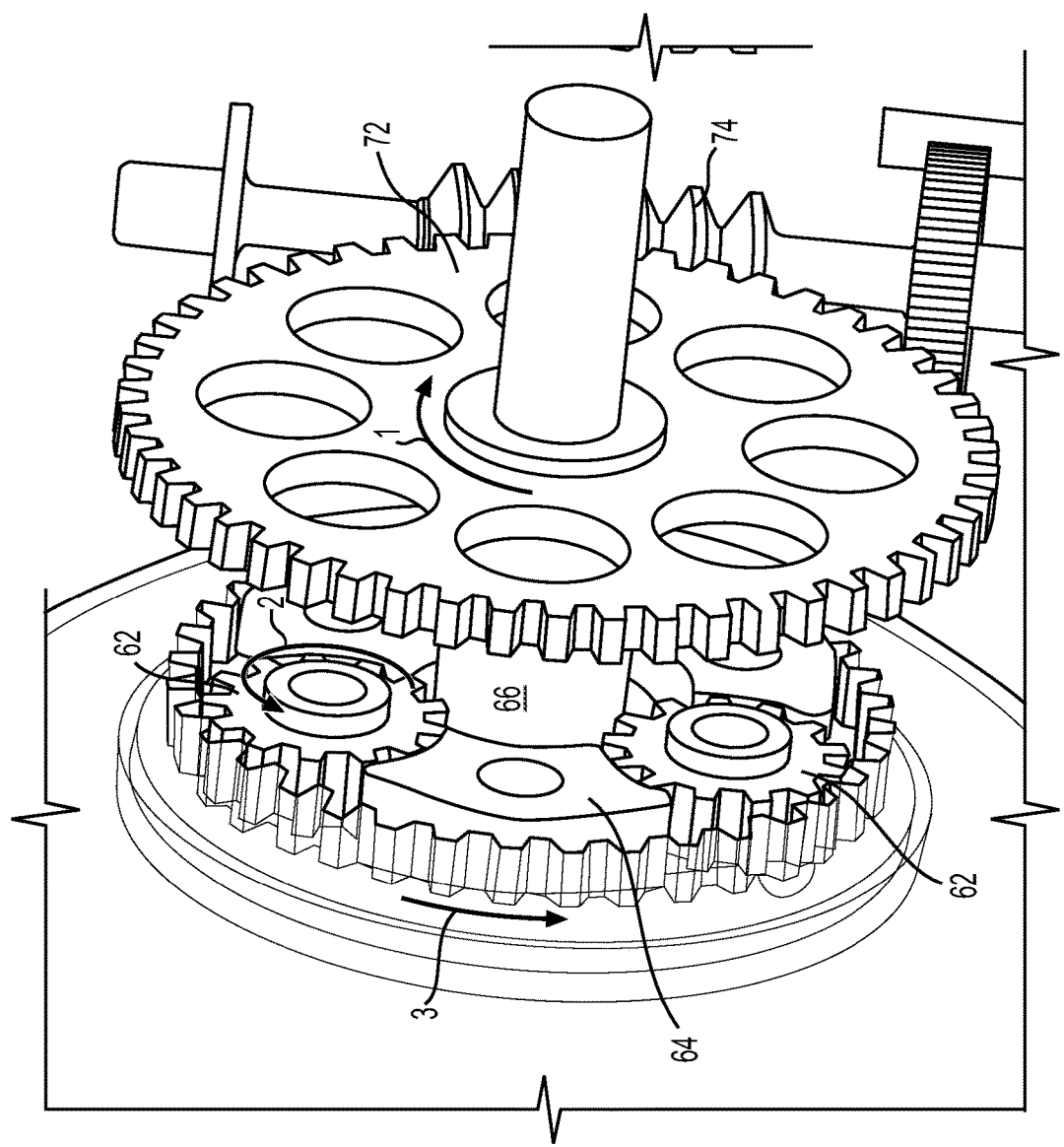
FIG. 3 is an enlarged view of the planetary gear system, showing the directions of rotation of various parts of the planetary gear system.

FIG. 2 shows the valve body 10 mounted in a housing 50 and connected to a drive system 60. As mentioned above, the toothed inner wall 42 of the second recess 40 can function as a ring gear in a planetary gear system. FIGS. 2 and 3 show such a planetary gear system, with a plurality of planet gears 62 meshing with the toothed inner wall 42 and being carried by a planet carrier 64. The planet gears 62 also mesh with a central sun gear; the sun gear is mounted on a shaft 66 that is accommodated in the additional recess 48.

As shown in FIG. 2, an input shaft 70 is used to drive the planetary gear system. A pinion 72 is fixedly mounted on this shaft 70, and the pinion 72 is in turn driven by a worm gear 74. The pinion rotates in a direction indicated by the arrow labelled "1", this rotation causes rotation of the planets around their axes in a direction indicated by the arrow labelled "2", which in turn causes the ring gear (and thus the valve body) to rotate in a direction indicated by the arrow labelled "3".

Accordingly, rotation of the worm gear 74 causes rotation of the valve body 10; the direction of rotation of the valve body 10 depends on the direction of rotation of the worm gear 74.

Providing the ring gear as an integral part of the valve body 10 reduces the total number of parts in the valve, and can thus reduce the size and mass of the overall package of the valve and its drive system. Further, it reduces the risk of the planetary gear system becoming detached from the valve body 10 (through mechanical failure of a part).

In addition, as there are fewer parts involved in the drive train (as compared to a prior art ball valve using a planetary gear system), there is less backlash in the drive train. Thus, the valve body 10 can be positioned more accurately. This precision in positioning the valve body 10 allows a smaller ball valve to be used, and thus a further reduction in the size and mass of the overall system.

Figure 4:
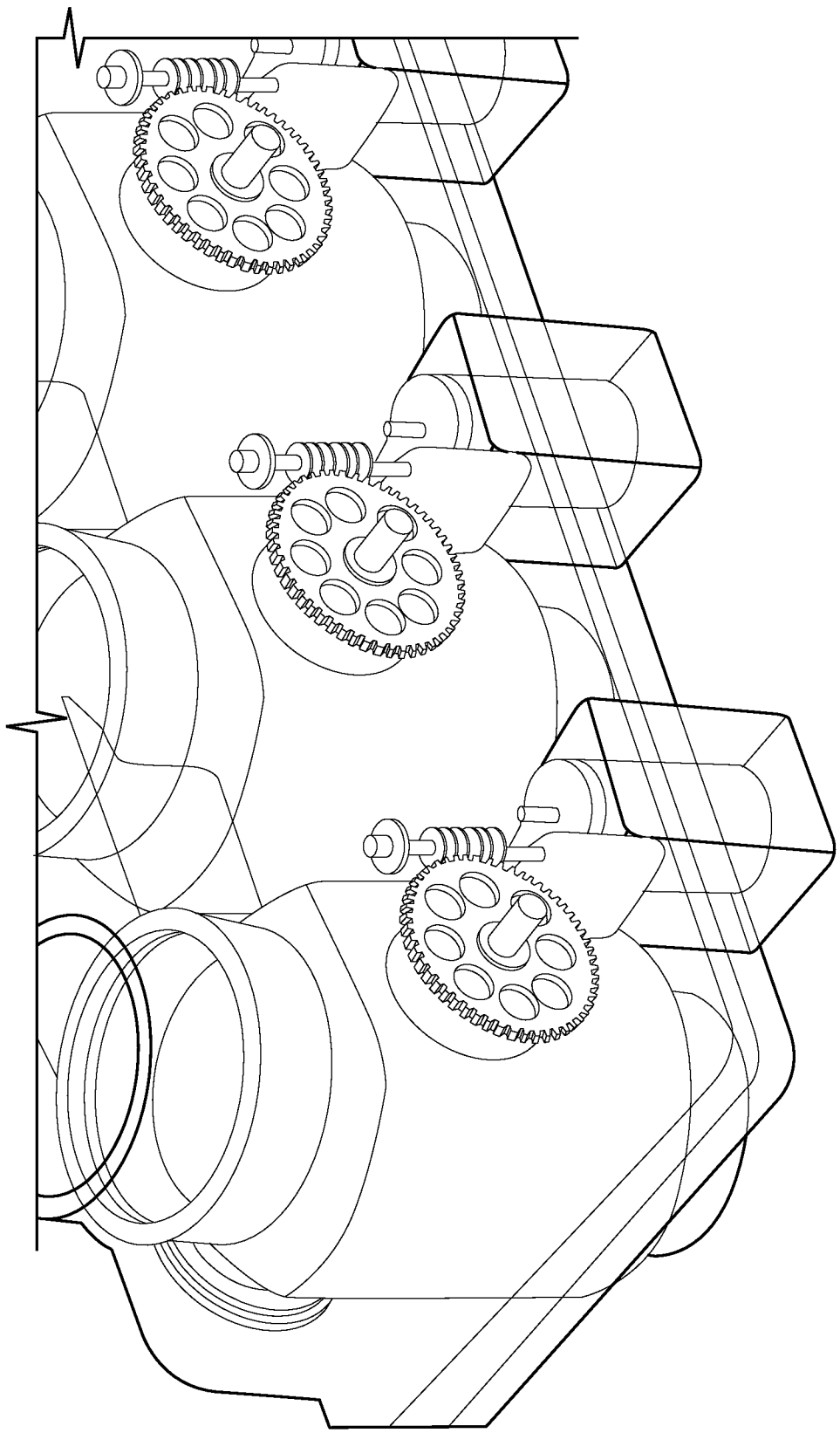
FIG. 4 is a schematic view of a part of a refuel manifold using a plurality of the ball valves.

The system of the invention is particularly suited to use in aerospace applications, where size and mass are of considerable importance. The system finds particular use in a refuel manifold for a gas turbine engine of an aircraft, where four flow control devices (valves) must be packaged into a single removable component. A schematic view of part of such a manifold is shown in FIG. 4 (although the fourth valve is not shown, and the second and third valves are only shown in part). The small size of the valve allows four valves to be packaged in a single manifold. Further, as the valve body can be driven by the gearbox rather than through adaptors and drive shafts, the entire flow control assembly can be packaged in a much smaller space.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A ball valve, comprising:
   a valve body, wherein the valve body is configured to be driven to rotate about an axis of rotation through a drive train that includes a planetary gear set, the valve body defining a recess defined in an outer surface of the valve body in alignment with the axis of rotation and leading to a recessed surface that is disposed within an outer periphery of the valve body, the recessed surface defining an aperture concentric with the axis of rotation, the recessed surface extending across a majority of the recess, and
   wherein a gear of the planetary gear set is integrally formed with the valve body at a location disposed between the recessed surface and the outer periphery of the valve body, the gear being disposed so that the recessed surface extends beyond an inner periphery of the gear along a radial direction towards the aperture.

2. The ball valve of claim 1, wherein the gear of the planetary gear set is a ring gear of the planetary gear set.

3. The ball valve of claim 1, wherein the recess is a first recess; and wherein the outer surface of the valve body defines a second recess at an opposite side of the valve body from the first recess, the second recess being sized to accommodate a trunnion.

4. The ball valve of claim 3, wherein the second recess is smaller than the first recess.

5. The ball valve of claim 3, wherein a projection extends inwardly from the outer surface to define the second recess.

6. The ball valve of claim 5, wherein the projection is hollow.

7. The ball valve of claim 5, wherein an outer surface of the projection faces towards inner surfaces of the valve body.

8. The ball valve of claim 7, wherein the outer surface of the projection also faces towards a flow passage entrance defined through the valve body.

9. The ball valve of claim 5, wherein the aperture is smaller than the projection.

10. The ball valve of claim 1, wherein the valve body defines a flow passage having an entrance facing perpendicular to the axis of rotation.

11. The ball valve of claim 1, wherein the flow passage extends linearly through the valve body.

12. The ball valve of claim 1, wherein the flow passage is L-shaped.

13. The ball valve of claim 1, wherein the flow passage is T-shaped.

14. The ball valve of claim 1, wherein the planetary gear set includes a plurality of planet gears carried by a planet carrier so that the recessed surface is disposed between each planet gear of an interior of the valve body.

15. The ball valve of claim 14, further comprising:
an input shaft configured to drive the planetary gear system; and
a pinion mounted to the input shaft at a location spaced outwardly from the first recess in the valve body.

16. The ball valve of claim 15, further comprising a worm gear configured to drive the pinion.

17. The ball valve of claim 1, further comprising a housing in which the valve body is disposed, wherein a portion of the planetary gear set is disposed external of the housing.

18. The ball valve of claim 17, wherein a pinion of the planetary gear set is disposed external of the housing.

19. A refuel manifold for a gas turbine engine, comprising: a plurality of the ball valve of claim 1.

20. The refuel manifold of claim 19, wherein each of the ball valves includes a respective housing and wherein a pinion of the respective planetary gear set is disposed external of each housing.

\* \* \* \* \*